United States Patent
Masui et al.

(10) Patent No.: US 7,315,422 B2
(45) Date of Patent: Jan. 1, 2008

(54) IMAGE FORMING DEVICE

(75) Inventors: Atsuo Masui, Sakai (JP); Hiromichi Nose, Toyokawa (JP); Mamoru Terada, Sakai (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 77 days.

(21) Appl. No.: 11/184,606

(22) Filed: Jul. 19, 2005

(65) Prior Publication Data

US 2006/0018033 A1    Jan. 26, 2006

(30) Foreign Application Priority Data

Jul. 21, 2004    (JP)    .............................. 2004-212528

(51) Int. Cl.
G02B 15/14    (2006.01)

(52) U.S. Cl. ...................................... 359/680; 359/689

(58) Field of Classification Search ................ 359/680, 359/682, 791, 689
See application file for complete search history.

(56) References Cited

U.S. PATENT DOCUMENTS 5,539,582 A * 7/1996 Kohno et al. ................ 359/689
6,308,011 B1 * 10/2001 Wachi et al. ................. 396/72
6,351,337 B1 * 2/2002 Tanaka ........................ 359/684
6,433,940 B1 * 8/2002 Hankawa et al. ........... 359/689
6,611,386 B2 * 8/2003 Tanaka ........................ 359/689
2002/0097503 A1 * 7/2002 Kohno et al. ................ 359/690
2003/0099043 A1 * 5/2003 Takeuchi et al. ............ 359/682
2004/0004772 A1 * 1/2004 Ohashi et al. ............... 359/689
2005/0185287 A1 * 8/2005 Sekita ......................... 359/689

FOREIGN PATENT DOCUMENTS

JP    2002-14284 A    1/2002

* cited by examiner

Primary Examiner—Scott J. Sugarman
Assistant Examiner—James R Greece
(74) Attorney, Agent, or Firm—Sidney Austin LLP (57) ABSTRACT

An image forming device is provided with: a zoom lens system TL that performs magnification varying by changing the distance between the lens units; and an image sensor SR that converts an optical image formed by the zoom lens system TL into an electric signal. The zoom lens system TL comprises three lens units of negative, positive, positive configuration. The second lens unit Gr2 comprises three single lens elements of, from the object side, a positive lens element L21, a negative meniscus lens element L22 convex to the object side and a positive lens element L23. A condition $1.0<|P22/P21|<2.0$ (P21 is the optical power of the object side positive lens element L21 in the second lens unit GR2, and P22 is the optical power of the negative meniscus lens element L22 in the second lens unit GR2) is satisfied.

12 Claims, 6 Drawing Sheets

IMAGE FORMING DEVICE

This application is based on application No. 2004-212528 filed in Japan, the content of which is hereby incorporated by reference.

BACKGROUND OF THE INVENTION

1. Field of the Invention

The present invention relates to an image forming device, and more specifically, relates to an image forming device that optically forms an image of the object by a zoom lens system and outputs it as an electric signal by capturing the image by an image sensor, above all, an image forming device having a high-magnification and small-size zoom lens system.

2. Description of the Related Art

In recent years, digital cameras have been popularized that convert an optical image into an electric signal by using an image sensor such as a CCD (charge coupled device) instead of silver halide film, convert the data into digital form and record or transfer the digital data. Such digital cameras are provided with an image forming device having a taking lens system and an image sensor.

Since the number of pixels of image sensors tends to increase year by year, taking lens systems are required to have high optical performance corresponding to the increased number of pixels of the image sensors. Above all, a compact image forming device is desired that is provided with a zoom lens system capable of varying the magnification over a wide range without degrading the image quality.

Further, in recent years, because of improvements in the image processing capability of semiconductor devices and the like, an image forming device having a zoom function has come to be incorporated in or externally attached to personal computers, mobile computers, mobile telephones, PDAs (personal digital assistants) and the like, and this spurs the demand for high-performance and compact image forming devices.

For size reduction of the image forming device, size reduction of the zoom lens system provided therein is required, and as zoom lens systems aimed at size reduction, for example, so-called three-unit zoom lens systems of negative, positive, positive configuration comprising three units of, from the object side, a first lens unit having negative optical power, a second lens unit having positive optical power and a third lens unit having positive optical power have been proposed in large numbers. This type of zoom lens systems have characteristics such that they are small in the number of lens elements, have a comparatively simple movement mechanism and is suitable for size reduction.

An example thereof is a zoom lens system described in Japanese Laid-Open Patent Application No. 2002-14284. In the zoom lens system described in this document, a meniscus configuration is adopted to a negative lens element in the second lens unit to thereby reduce the thickness of the second lens unit, which enables reduction in the overall length in the collapsed condition. Moreover, although the performance is comparatively high, the number of lens units moved for changing the focal length is small and the movement mechanism is comparatively simple. Thus, this zoom lens system is suitable for compact cameras.

However, in the zoom lens system described in the document, the magnification variation ratio is at most twice even if the second lens unit includes three lens elements, which cannot be said to be sufficient. To achieve a higher magnification variation ratio, it is necessary to increase the number of lens elements of the second lens unit.

SUMMARY OF THE INVENTION

The present invention is made in view of the above-mentioned circumstances, and an object thereof is to provide an image forming device capable of obtaining a magnification variation ratio of as high as not less than three times without increasing the number of lens elements of the second lens unit while ensuring high optical performance in a three-unit zoom lens system of negative, positive, positive configuration.

To the above-mentioned object, a first aspect of the present invention is an image forming device provided with: a zoom lens system comprising a plurality of lens units and performing magnification varying by changing the distance between the lens units; and an image sensor that converts an optical image formed by the zoom lens system into an electric signal. The zoom lens system comprises three lens units of, from the object side, a first lens unit having negative optical power, a second lens unit having positive optical power, and a third lens unit having positive optical power. The second lens unit comprises three single lens elements of, from the object side, a positive lens element, a negative meniscus lens element convex to the object side, and a positive lens element. The following condition is satisfied:

$$1.0 < |P22/P21| < 2.0$$

where P21 is the optical power of the object side positive lens element in the second lens unit, and P22 is the optical power of the negative meniscus lens element in the second lens unit.

These and other objects, advantages and features of the invention will become apparent from the following description thereof taken in conjunction with the accompanying drawings, which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

Hereinafter, an image forming device will be described with reference to the drawings. The image forming device is an optical device that optically forms an image of the object and outputs it as an electric signal, and is a principal component of a camera used for taking still images and moving images of the object. Examples of such a camera include: digital cameras; video cameras; surveillance cameras; vehicle-mounted cameras; cameras for videophones; cameras for doorphones; and cameras incorporated in or externally attached to personal computers, mobile computers, mobile telephones and PDAs, peripherals (mice, scanners, printers, etc.) thereof, other digital apparatuses and the like.

As is apparent from these examples, not only a camera can be constructed by using the image forming device but also a camera function can be added by providing various apparatuses with the image forming device. For example, a digital apparatus having an image input function such as a camera phone can be constructed.

While the term "digital camera" conventionally denotes cameras that record only still images, digital still cameras and home digital movie cameras that are capable of handling both still images and moving images have also been proposed and presently, these cameras are not specifically distinguished from each other. Therefore, the term "digital camera" includes all of the cameras such as digital still cameras, digital movie cameras and web cameras (cameras connected to apparatuses that enable image transmission and reception by being connected to a network irrespective of whether it is an open type or a private type; including both of cameras directly connected to the network and cameras connected through an apparatus having an information processing function such as a personal computer) whose principal component is an image forming device including a taking lens system that forms an optical image and an image sensor that converts the optical image into an electric video signal.

Figure 7:
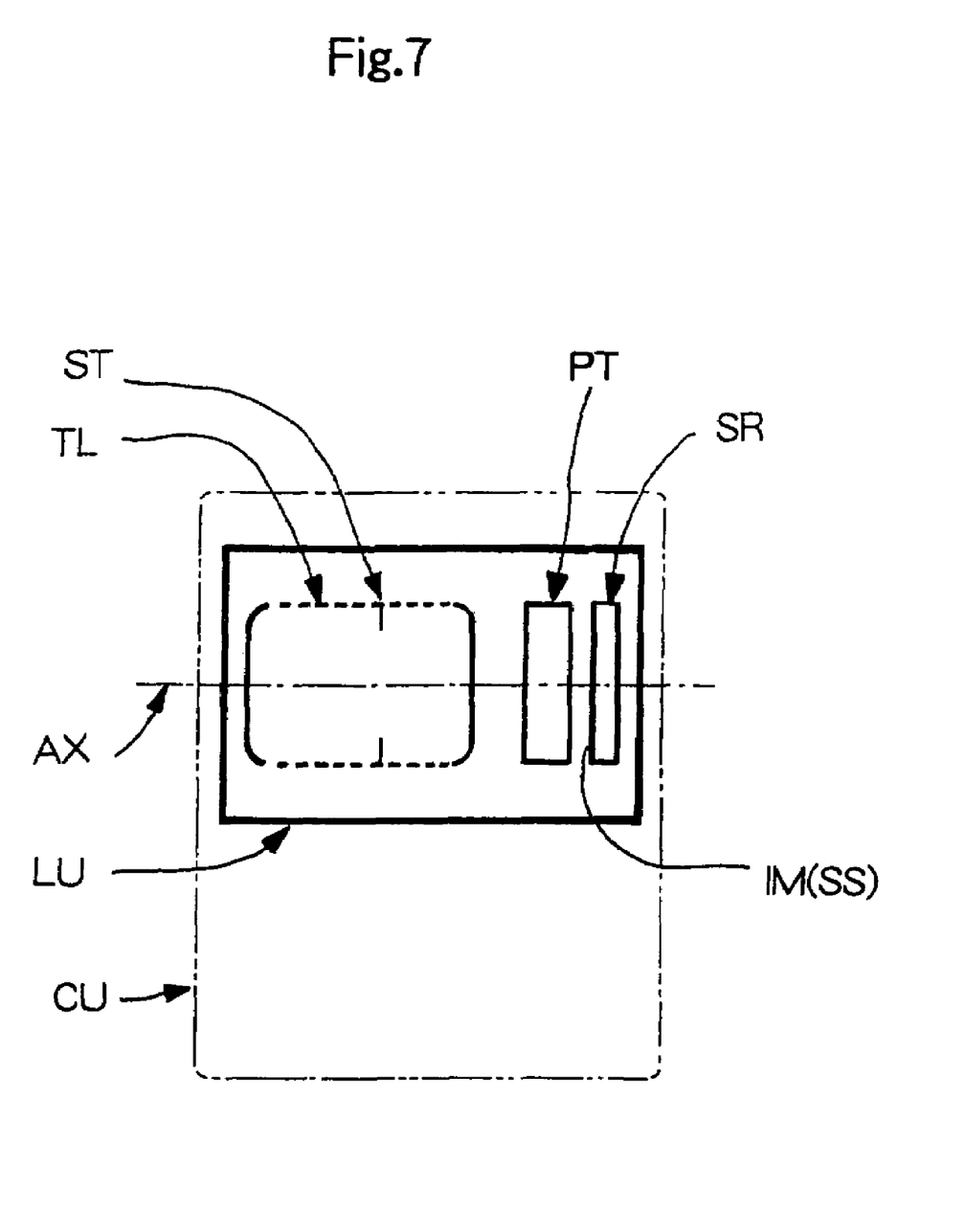
FIG. 7 is a schematic view showing an example of a schematic structure of an optical system of an image forming device.

FIG. 7 shows an example of the structure of the image forming device LU. The image forming device LU comprises from the object (that is, the subject) side: a zoom lens system (corresponding to the taking lens system, ST is a diaphragm) TL that forms an optical image (IM: image surface) of an object so that the magnification is variable; a plane parallel plate PT (an optical filter such as an optical low-pass filter or an infrared cut filter disposed as required; corresponding to a cover glass or the like of an image sensor SR); and the image sensor SR that converts the optical image IM formed on a light receiving surface SS by the zoom lens system TL, into an electric signal. The image forming device LU constitutes a part of a digital apparatus CU corresponding to a digital camera or a portable information apparatus (that is, a compact and portable information apparatus terminal such as a mobile telephone or a PDA).

When a digital camera is constructed by use of the image forming device LU, normally, the image forming device LU is disposed within the body of the camera, and when a camera function is realized, a configuration as required may be adopted. For example, a unitized image forming device LU may be formed so as to be detachably attachable or rotatable with respect to the camera body, or a unitized image forming device LU may be formed so as to be detachably attachable or rotatable with respect to a portable information apparatus (a mobile telephone, a PDA, etc.).

The zoom lens system TL comprises a plurality of lens units, and is structured so that a plurality of lens units move along the optical axis AX and magnification varying (that is, zooming) is performed by changing the distance between the lens units. In the embodiments described later, the zoom lens system TL has a three-unit zoom construction of negative, positive, positive configuration, and the three lens units are all movable units. As the image sensor SR, for example, a solid-state image sensor such as a CCD (charge coupled device) or a CMOS (complementary metal oxide semiconductor) sensor having a plurality of pixels is used. The optical image formed (on the light receiving surface SS of the image sensor SR) by the zoom lens system TL is converted into an electric signal by the image sensor SR.

The signal generated by the image sensor SR undergoes predetermined digital image processing, image compression processing and the like as required and is recorded onto a memory (a semiconductor memory, an optical disk, etc.) as a digital video signal, or in some cases, is transmitted to another apparatus through a cable or by being converted into an infrared signal.

While in the image forming device LU shown in FIG. 7, reduction projection from the object on the enlargement side onto the image sensor SR on the reduction side is performed by the zoom lens system TL, by using a display device (for example, a liquid crystal display device) that displays a two-dimensional image instead of the image sensor SR and using the zoom lens system TL as the projection lens system, an image projector can be constructed that performs enlargement projection from the image display surface on the reduction side onto the screen surface on the enlargement side. That is, the zoom lens system TL of each embodiment described below is not only usable as a taking lens system but also suitably usable as a projection lens system.

Figure 1:
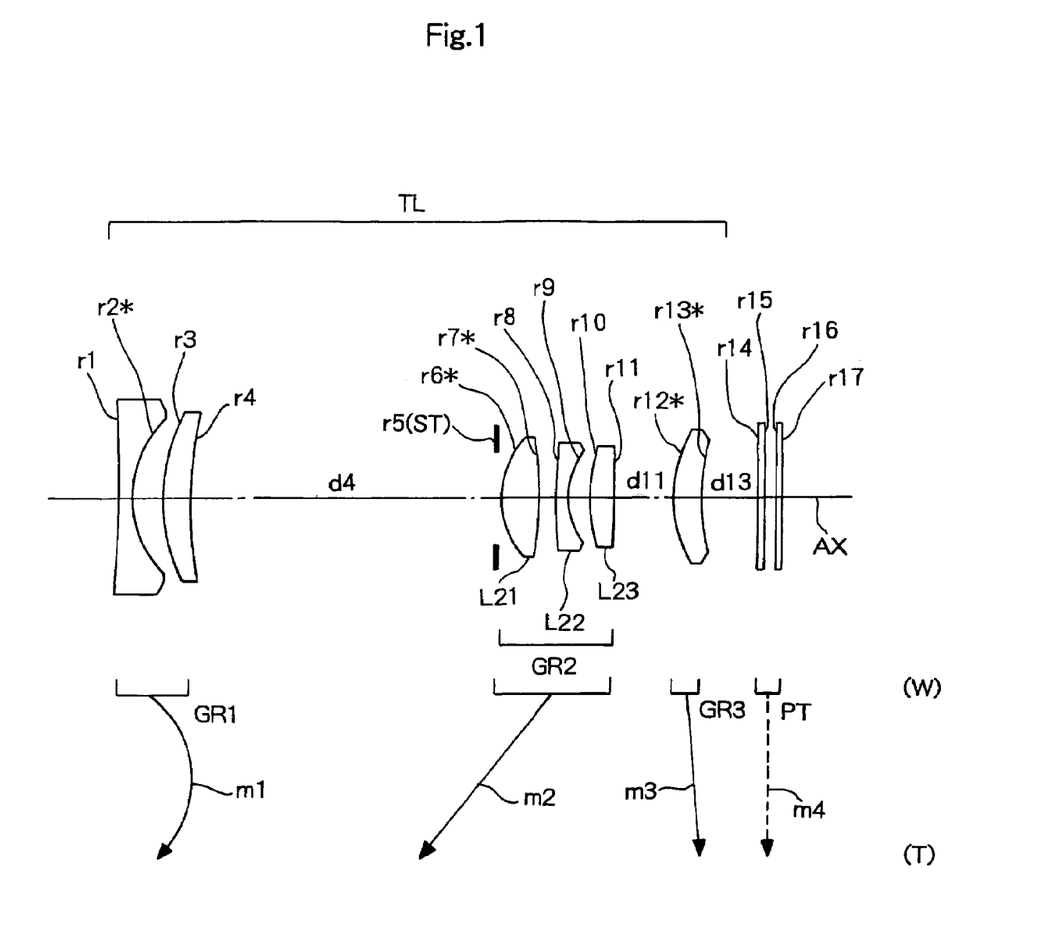
FIG. 1 is a lens construction view of a first embodiment.
Figure 2:
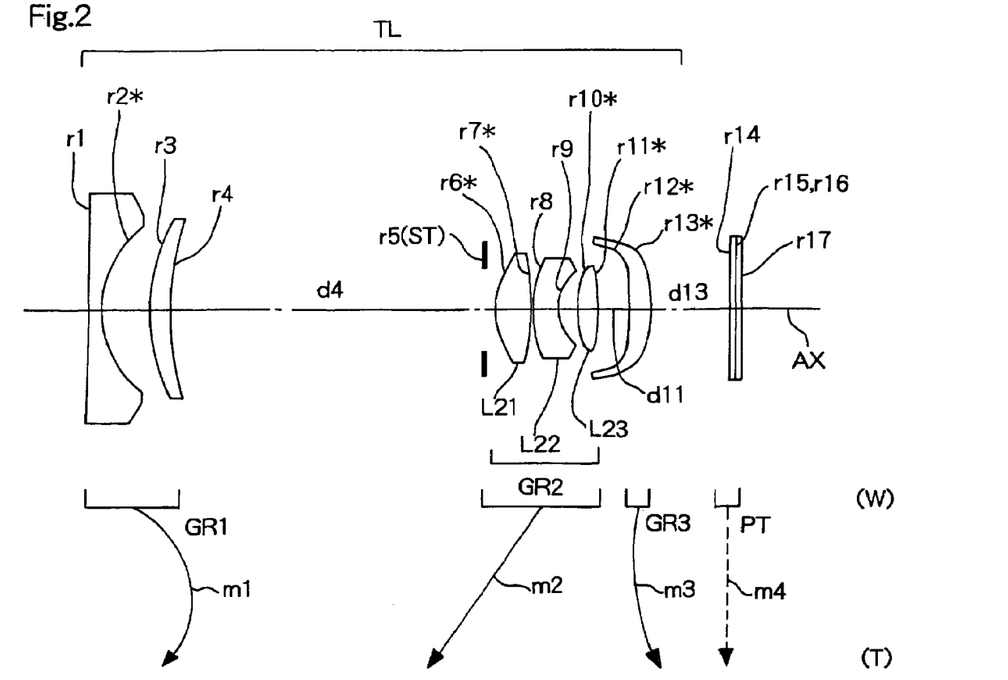
FIG. 2 is a lens construction view of a second embodiment.
Figure 3:
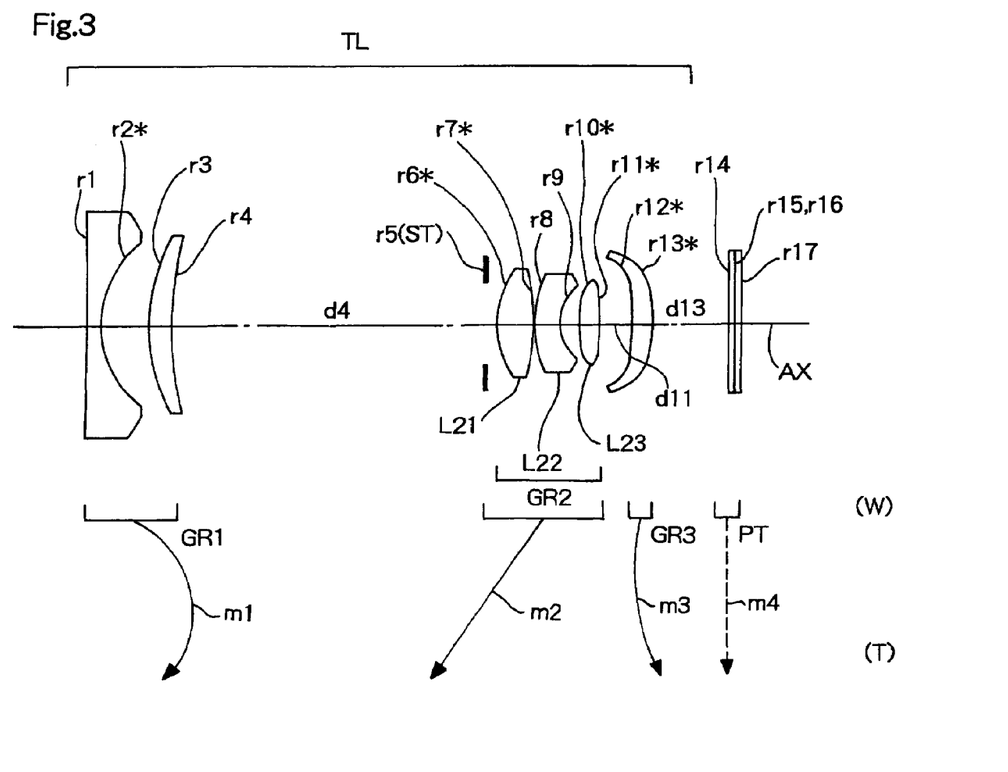
FIG. 3 is a lens construction view of a third embodiment.

FIGS. 1 to 3, which are lens construction views corresponding to the zoom lens systems TL constituting the first to third embodiments, respectively, show the lens arrangement at the wide angle end (W) by a cross section. In the lens construction views, the surface designated ri (i=1, 2, 3, . . . ) are the i-th surfaces counted from the object side (surfaces designated ri marked with * are aspherical surfaces), and the axial distances designated di (i=1, 2, 3, . . . ) are, of the i-th axial distances counted from the object side, variable distances that vary in zooming.

In the lens construction views, the solid arrows m1, m2 and m3 schematically show the movements of a first lens unit GR1, a second lens unit GR2 and a third lens unit GR3 in zooming from the wide angle end (W) to the telephoto end (T), and the dashed arrow m4 shows that the plane parallel plate PT is stationary in zooming. In any of the embodiments, the diaphragm ST is disposed between the first lens unit GR1 and the second lens unit GR2, and the diaphragm ST moves together with the second lens unit GR2 in zooming (the solid arrow m2).

The zoom lens systems TL of the first to third embodiments are three-unit zoom lens systems comprising from the object side: the first lens unit GR1 having negative optical power (optical power is an amount defined by the reciprocal of the focal length); the second lens unit GR2 having positive optical power; and the third lens unit GR3 having positive optical power, and performing zooming by varying the distances between lens units.

The zoom lens systems TL adopt a zoom construction in which at least the first lens unit GR1 and the second lens unit GR2 are movable units, and have a magnification variation range in which the first lens unit GR1 moves toward the image side and the second lens unit GR2 moves toward the object side in zooming from the wide angle end (W) to the telephoto end (T). That is, the second lens unit GR2 performs magnification varying by moving toward the object side as a variator, and the position shift of the focal point is corrected by a movement of the first lens unit GR1. By adopting such a zoom construction, the image surface in the middle focal length condition can be excellently corrected. The lens construction of each embodiment will be described below in detail.

In the first embodiment (FIG. 1), in the three-unit zoom construction of negative, positive, positive configuration, the lens units are constructed as follows:

The first lens unit GR1 comprises from the object side: a bi-concave lens element whose image side surface is an aspherical surface and a positive meniscus lens element convex to the object side. The second lens unit GR2 comprises from the object side: a bi-convex positive lens element L21 whose both side surfaces are aspherical surfaces; a negative meniscus lens element L22 convex to the object side; and a bi-convex positive lens element L23. On the object side of the second lens unit GR2, the diaphragm ST is disposed that moves together with the second lens unit GR2 in zooming. The third lens unit GR3 comprises only a positive meniscus lens element convex to the object side. In zooming from the wide angle end (W) to the telephoto end (T), the first lens unit GR1 moves toward the image side and then, makes a U-turn from the image side toward the object side, the second lens unit GR2 monotonously moves toward the object side, and the third lens unit GR3 monotonously moves toward the image side.

In the second embodiment (FIG. 2), in the three-unit zoom construction of negative, positive, positive configuration, the lens units are constructed as follows:

The first lens unit GR1 comprises from the object side: a negative meniscus lens element concave in the image side and whose image side surface is an aspherical surface; and a positive meniscus lens element convex to the object side. The second lens unit Gr2 comprises from the object side: a bi-convex positive lens element L21 whose both side surfaces are aspherical surfaces; a negative meniscus lens element L22 convex to the object side; and a bi-convex positive lens element L23 whose both side surfaces are aspherical surfaces. On the object side of the second lens unit GR2, the diaphragm ST is disposed that moves together with the second lens unit GR2 in zooming. The third lens unit GR3 comprises only a positive meniscus lens element convex to the image side and whose both side surfaces are aspherical surfaces. In zooming from the wide angle end (W) to the telephoto end (T), the first lens unit GR1 moves toward the image side and then, makes a U-turn from the image side toward the object side, the second lens unit GR2 monotonously moves toward the object side, and the third lens unit GR3 moves toward the object side and then, makes a U-turn from the object side toward the image side.

In the third embodiment (FIG. 3), in the three-unit zoom construction of negative, positive, positive configuration, the lens units are constructed as follows:

The first lens unit GR1 comprises from the object side: a bi-concave lens element whose image side surface is an aspherical surface; and a positive meniscus lens element convex to the object side. The second lens unit GR2 comprises from the object side: a bi-convex positive lens element L21 whose both side surfaces are aspherical surfaces; a negative meniscus lens element L22 convex to the object side; a bi-convex positive lens element L23 whose both side surfaces are aspherical surfaces. On the object side of the second lens unit GR2, the diaphragm ST is disposed that moves together with the second lens unit GR2 in zooming. The third lens unit GR3 comprises only a positive meniscus lens element convex to the image side and whose both side surfaces are aspherical surfaces. In zooming from the wide angle end (W) to the telephoto end (T), the first lens unit GR1 moves toward the image side and then, makes a U-turn from the image side toward the object side, the second lens unit GR2 monotonously moves toward the object side, and the third lens unit GR3 moves toward the object side and then, makes a U-turn from the object side toward the image side.

As described above, in all of these embodiments, the second lens unit GR2 comprises three lens elements of, from the object side, the positive lens element L21, the negative meniscus lens element L22 convex to the object side and the positive lens element L23. By forming the second lens unit of three simple lens elements of, from the object side, a positive lens element, a negative meniscus lens element convex to the object side and a positive lens element in a three-unit zoom lens system of negative, positive, positive configuration as described above, a compact zoom lens system can be realized in which the number of lens elements is small and the movement mechanism is comparatively simple. Further, by adopting a meniscus configuration for the negative lens element in the second lens unit, the thickness of the second lens unit can be reduced to thereby reduce the overall optical length.

That is, in the second lens unit having three lens elements of positive, negative, positive configuration, by the negative lens element not being a bi-concave lens element but being a negative meniscus lens element convex to the object side, the distance between the object side two lens elements (the positive lens element L21 and the negative meniscus lens element L22 in each embodiment) in the second lens unit can be reduced to thereby make the second lens unit compact.

To well-balancedly obtain the above-mentioned effect and obtain a magnification variation ratio of as high as not less than three times without increasing the number of lens elements of the second lens unit while ensuring high optical performance in a three-unit zoom lens system of negative, positive, positive configuration, it is preferable to satisfy the following condition (1):

$$1.0<|P22/P21|<2.0 \qquad (1)$$

where P21 is the optical power of the object side positive lens element in the second lens unit, and P22 is the optical power of the negative meniscus lens element in the second lens unit.

The condition (1) defines a preferable condition range with respect to the optical power of the negative meniscus lens element in the second lens unit. When the lower limit of the condition (1) is exceeded, it is difficult to correct the image surface by reducing the Petzval sum of the zoom lens system. Conversely, when the upper limit of the condition (1) is exceeded, the curvature of the image side surface of the negative meniscus lens element is too high, so that the thickness of the second lens unit increases and this increases the overall length of the zoom lens system in the collapsed condition.

It is further preferable to satisfy at least one of the following conditions (1a) and (1b):

$$1.05<|P22/P21|<2.00 \qquad (1a)$$

$$1.00<|P22/P21|<1.15 \qquad (1b)$$

The conditions (1a) and (1b) define, of the condition range defined by the condition (1), further preferable condition ranges based on the above-mentioned viewpoint and the like.

By satisfying the condition (1) in each embodiment, the image forming device LU can be realized that is capable of obtaining a magnification variation ratio of as high as not less than three times without increasing the number of lens elements of the second lens unit GR2 while ensuring high optical performance in the three-unit zoom lens system TL of negative, positive, positive configuration. The use of the image forming device LU according to each embodiment for the digital apparatus CU such as a digital camera or a portable information apparatus contributes to reduced thickness, weight and size, reduced cost, higher performance, higher functionality and the like of the digital apparatus CPU. Conditions for well-balancedly obtaining these effects and achieving higher optical performance and the like will be described below:

To obtain the effects of weight reduction, size reduction, cost reduction and the like of the zoom lens system by a reduction in the number of lens elements, it is preferable to satisfy the following condition (2):

$$N1/N2<1 \qquad (2)$$

where N1 is the number of lens elements constituting the first lens unit, and N2 is the number of lens elements constituting the second lens unit.

The condition (2) defines a preferable condition range with respect to the number of lens elements of the first lens unit. By satisfying the condition (2), the overall optical length of the zoom lens system can be reduced while excellent optical performance is maintained. When the upper limit of the condition (2) is exceeded, the thickness of the first lens unit increases, so that it is difficult to reduce the overall length in the collapsed condition.

It is further preferable to satisfy the following condition (2a):

$$N1/N2=2/3 \tag{2a}$$

The condition (2a) defines, of the condition range defined by the condition (2), a further preferable condition range based on the above-mentioned viewpoint and the like.

In balancing the increase in magnification variation ratio with the reduction in size in the zoom lens system, it is preferable to satisfy the following condition (3):

$$3 < ft/fw < 5 \tag{3}$$

where fw is the overall focal length of the zoom lens system at the wide angle end, and ft is the overall focal length of the zoom lens system at the telephoto end.

The condition (3) defines a preferable condition range with respect to the magnification variation ratio (that is, zoom ratio) of the zoom lens system. By satisfying the condition (3), a size reduction of the zoom lens system can be achieved while a magnification variation ratio of as high as not less than three times is ensured. When the zoom ratio is lower than the lower limit of the condition (3), the significance of the optical zooming is reduced, so that user benefit cannot be achieved. Conversely, when the zoom ratio is higher than the upper limit of the condition (3), the overall length is too large particularly in the longest focal length condition, so that it is difficult to achieve a size reduction of the image forming apparatus. In the examples described below, a zoom ratio of three to four times is achieved as well as a smaller size and higher performance.

It is further preferable to satisfy at least one of the following conditions (3a) and (3b):

$$3.5 < ft/fw < 5.0 \tag{3a}$$

$$3.0 < ft/fw < 4.0 \tag{3b}$$

The conditions (3a) and (3b) define, of the condition range defined by the condition (3), further preferable condition ranges based on the above-mentioned viewpoint and the like.

In balancing the increase in magnification variation ratio with the reduction in size in the zoom lens system, it is preferable to satisfy the following condition (4):

$$7 < Lw/fw < 10 \tag{4}$$

where Lw is the overall optical length (the length from the most object side surface of the zoom lens system to the image surface) at the wide angle end, and fw is the overall focal length of the zoom lens system at the wide angle end.

The condition (4) defines a preferable condition range with respect to the overall length at the wide angle end. By satisfying the condition (4), a size reduction of the zoom lens system can be achieved while a magnification variation ratio of as high as not less than three times is ensured. When the lower limit of the condition (4) is exceeded, the movement amount of the second lens unit which is a variator is reduced, so that it is difficult to obtain a higher magnification variation ratio. Conversely, when the upper limit of the condition (4) is exceeded, the overall length is too long, so that it is difficult to achieve a size reduction of the zoom lens system.

It is further preferable to satisfy at least one of the following conditions (4a) and (4b):

$$8.0 < Lw/fw < 10.0 \tag{4a}$$

$$7.0 < Lw/fw < 9.5 \tag{4b}$$

The conditions (4a) and (4b) define, of the condition range defined by the condition (4), further preferable condition ranges based on the above-mentioned viewpoint and the like.

In balancing the increase in magnification variation ratio with the reduction in size in the zoom lens system, it is preferable to satisfy the following condition (5):

$$1.5 < |f1 \times fw/Lw| < 2.5 \tag{5}$$

where f1 is the focal length (mm) of the first lens unit, fw is the overall focal length (mm) of the zoom lens system at the wide angle end, and Lw is the overall optical length (the length from the most object side surface of the zoom lens system to the image surface, mm) at the wide angle end.

The condition (5) defines a preferable condition range with respect to the focal length of the first lens unit. By satisfying the condition (5), a size reduction of the zoom lens system can be achieved while distortion is excellently corrected. When the lower limit of the condition (5) is exceeded, the optical power of the first lens unit increases, so that it is difficult to correct the negative distortion caused at the wide angle end. Conversely, when the upper limit of the condition (5) is exceeded, it is difficult to reduce the front lens diameter by largely bending the off-axial light at the wide angle end by the first lens unit.

It is further preferable to satisfy at least one of the following conditions (5a) and (5b):

$$1.8 < |f1 \times fw/Lw| < 2.5 \tag{5a}$$

$$1.5 < |f1 \times fw/Lw| < 2.0 \tag{5b}$$

The conditions (5a) and (5b) define, of the condition range defined by the condition (5), further preferable condition ranges based on the above-described viewpoint and the like.

While the diaphragm ST is used as an optical element in addition to the lens elements in the zoom lens system TL constituting each embodiment, a luminous flux restricting plate (for example, a flare cutter) for cutting unnecessary light as required may be disposed as required. For example, by using a flare cutter that is independently moved on the image side of the second lens unit, the flare of the off-axial light can be removed.

While refractive type lenses that deflect the incident ray by refraction (that is, lenses of a type in which the incident ray is deflected at the interface between media having different refractive indices) are used for the zoom lens system TL constituting each embodiment, the usable lenses are not limited thereto. For example, the following lenses may be used: diffractive type lenses that deflect the incident ray by diffraction, refractive-diffractive hybrid type lenses that deflect the incident ray by a combination of diffraction and refraction, or gradient index type lenses that deflect the incident ray by the distribution of refractive index in the medium. However, since the gradient index type lens whose refractive index changes within the medium increases the cost because of its complicated manufacturing method, it is preferable to use a lens of a homogeneous material having a uniform refractive index distribution.

The above-described embodiments and the examples described below include the following structures, and according to the structures, a low-cost and compact zoom lens system can be realized that is capable of obtaining a high magnification variation ratio with a small number of lens elements while ensuring excellent optical performance. The use of the zoom lens system as the taking lens system of a digital camera, a portable information apparatus (a mobile telephone, a PDA, etc.) and the like contributes to a reduced weight and size, reduced cost, higher performance, higher functionality and the like of the apparatus.

(Z1) A zoom lens system that comprises a plurality of lens units and performs magnification varying by changing the distances between the lens units comprises three units of, from the object side, a first lens unit having negative optical power, a second lens unit having positive optical power and a third lens unit having positive optical power. In the zoom lens system, the second lens unit comprises three single lens elements of, from the object side, a positive lens element, a negative meniscus lens element convex to the object side and a positive lens element, and at least one of the conditions (1), (1a) and (1b) is satisfied.

(Z2) In the zoom lens system according to (Z1), at least one of the conditions (2), (2a), (3), (3a), (3b), (4), (4a), (4b), (5), (5a) and (5b) is satisfied.

(Z3) In the zoom lens system according to (Z1) or (Z2), at least the first lens unit and the second lens unit move in zooming.

(Z4) In the zoom lens system according to (Z3), a magnification variation range is provided in which the first lens unit moves toward the image side and the second lens unit moves toward the object side in zooming from the wide angle end to the telephoto end.

(Z5) Further, in the zoom lens system according to any of (Z1) to (Z4), a diaphragm is provided between the first lens unit and the second lens unit.

(Z6) In the zoom lens system according to (Z5), the diaphragm moves together with the second lens unit in zooming from the wide angle end to the telephoto end.

(Z7) In the zoom lens system according to any of (Z1) to (Z6), the second lens unit comprises from the object side: a bi-convex positive lens element; a negative meniscus lens element convex to the object side; and a bi-convex positive lens element.

(U1) An image forming device comprising: a zoom lens system according to any of (Z1) to (Z7); and an image sensor that converts an optical image formed by the zoom lens system into an electric signal.

(C1) A camera having the image forming device according to (U1), and used at least one of still image taking and moving image taking of an object.

(C2) A camera according to (C1) is a digital camera, a video camera, or a camera incorporated in or externally attached to a mobile telephone, a portable digital assistant, a personal computer, a mobile computer or a peripheral thereof.

(D1) A digital apparatus to which at least one function of still image taking and moving image taking of an object by being provided with the image forming device according to (U1).

(D2) A digital apparatus according to (D1) which is a mobile telephone, a PDA, a personal computer, a mobile computer or a peripheral thereof.

Hereinafter, the structure and the like of the zoom lens system will be further concretely described with reference to construction data, aspherical surface data and the like. A first to third examples shown here are numerical examples corresponding to the above-described first to third embodiments, respectively, and the optical construction views showing the first to third embodiments (FIGS. 1 to 3) show the lens constructions of the corresponding first to third examples, respectively. Table shows values, corresponding to the conditions, of the examples.

In the basic optical constructions (i: surface number), ri (i=1, 2, 3, . . . ) is the radius of curvature (unit: mm) of the i-th surface counted from the object side, di (i=1, 2, 3, . . . ) is the axial distance (unit: mm) between the i-th surface and the (i+1)-th surface counted from the object side, and Ni (i=1, 2, 3, . . . ) and vi (i=1, 2, 3, . . . ) are the refractive index (Nd) and the Abbe number (vd), to the d-line, of the i-th optical element from the object side.

The axial distances di that vary in zooming are variable air distances among the wide-angle end (the shortest focal length condition, W), the middle (the middle focal length condition, M) and the telephoto end (the longest focal length condition, T), and f and FNO represent the overall focal lengths (unit: mm) and the f-numbers corresponding to the focal length conditions (W), (M) and (T), respectively.

The surfaces whose data of the radius of curvature ri is marked with * (asterisk) are aspherical surfaces (dioptric surfaces having an aspherical configuration, surfaces having a refractive property equivalent to an aspherical surface, etc.), and are defined by the following expression (AS) expressing the surface configuration of an aspherical surface. Here, the coefficients for the unindicated terms are 0, and for all the data, $E-n = \times 10^{-n}$.

$$X(H) = (C0 \cdot H^2)/\{1 + \sqrt{(1 - \epsilon \cdot C0^2 \cdot H^2)}\} + \Sigma(Aj \cdot H^j) \quad \text{(AS)}$$

In the expression (AS),

X(H) is the amount of displacement in the direction of the optical axis AX at a height H (with the vertex as the reference), H is the height in a direction vertical to the optical axis AX, C0 is the paraxial curvature (=1/ri), $\epsilon$ is the quadric surface parameter, and Aj is the j-th-order aspherical coefficient.

Figure 4:
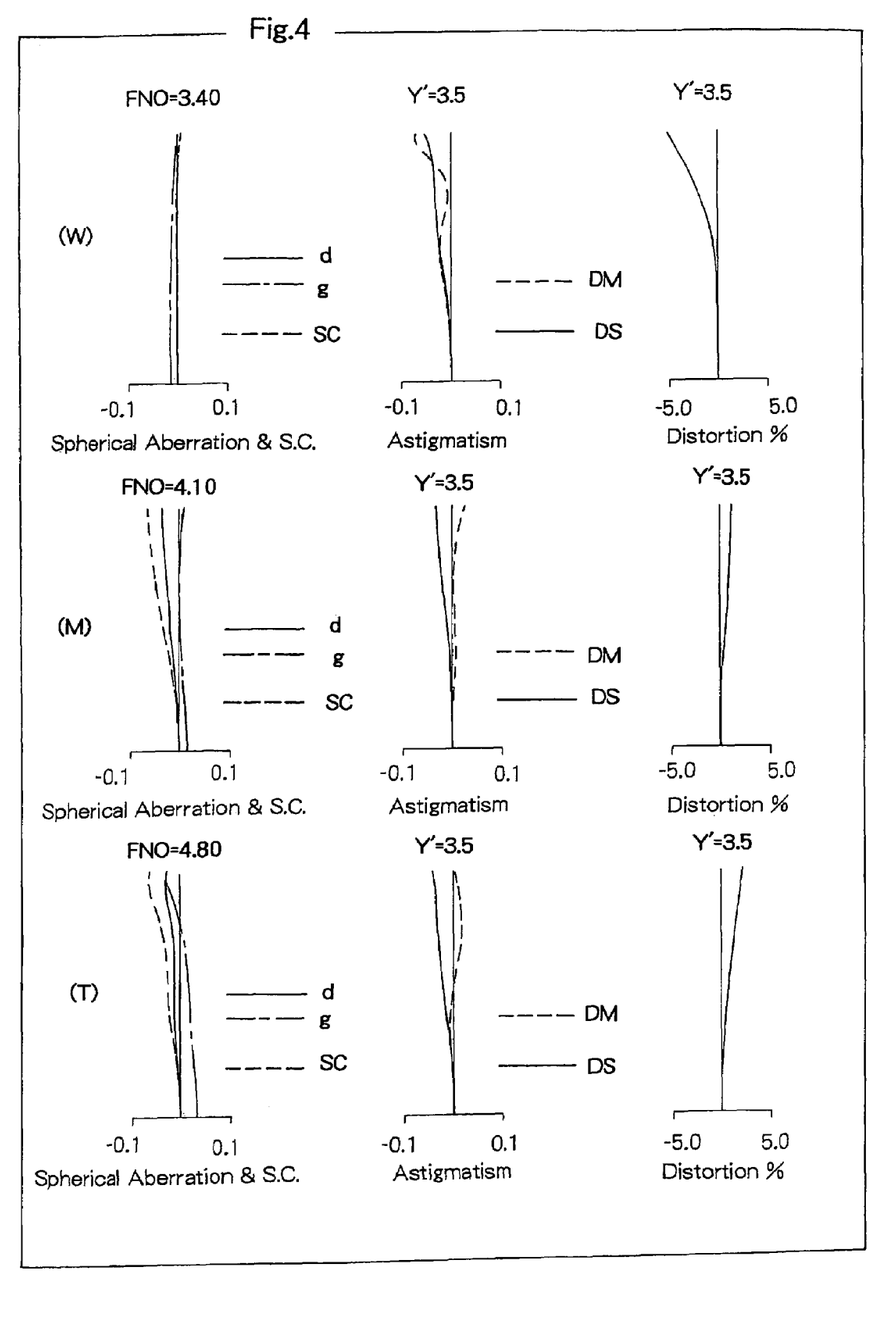
FIG. 4 is graphic representations of aberrations of the first embodiment.
Figure 5:
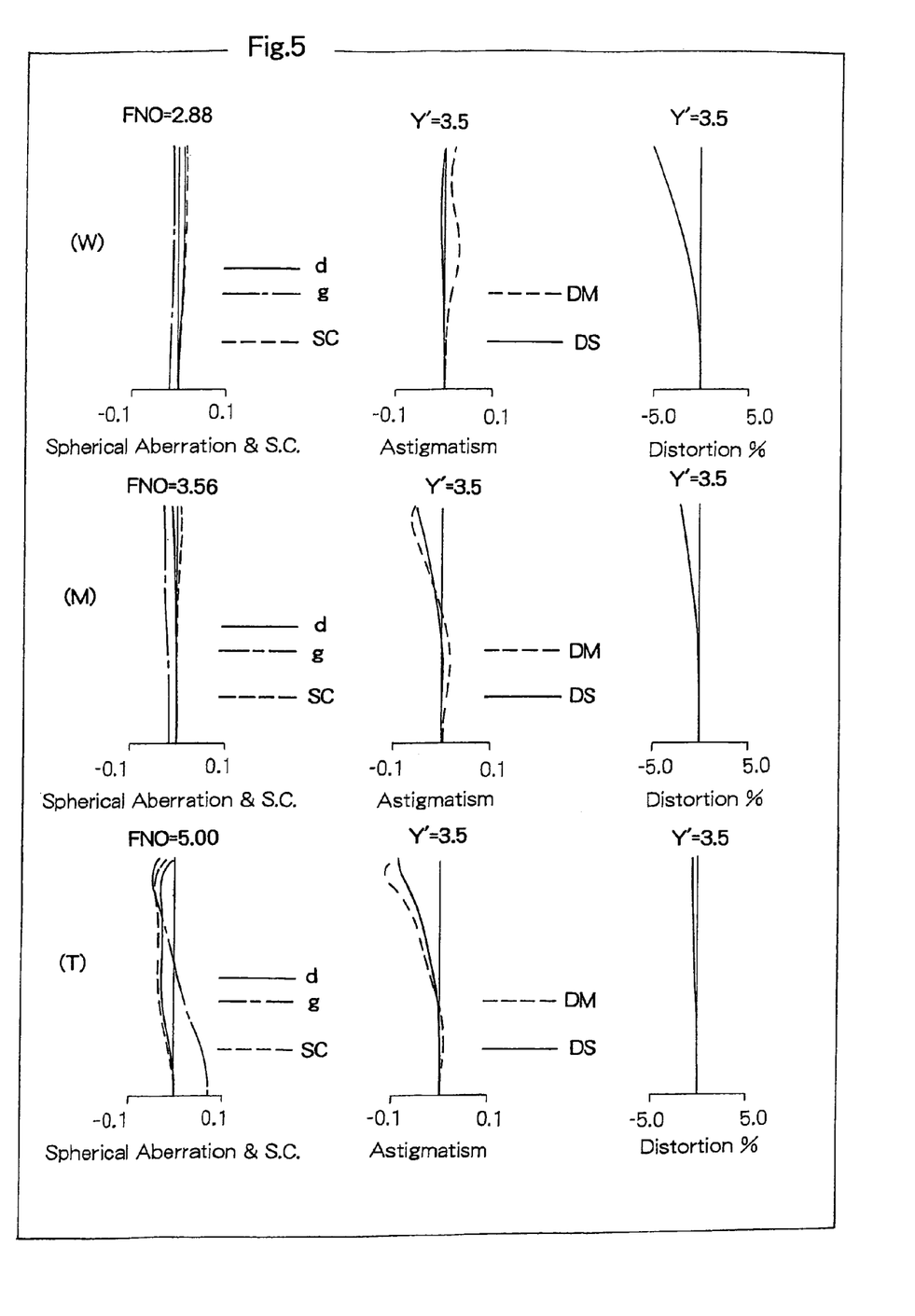
FIG. 5 is graphic representations of aberrations of the second embodiment.
Figure 6:
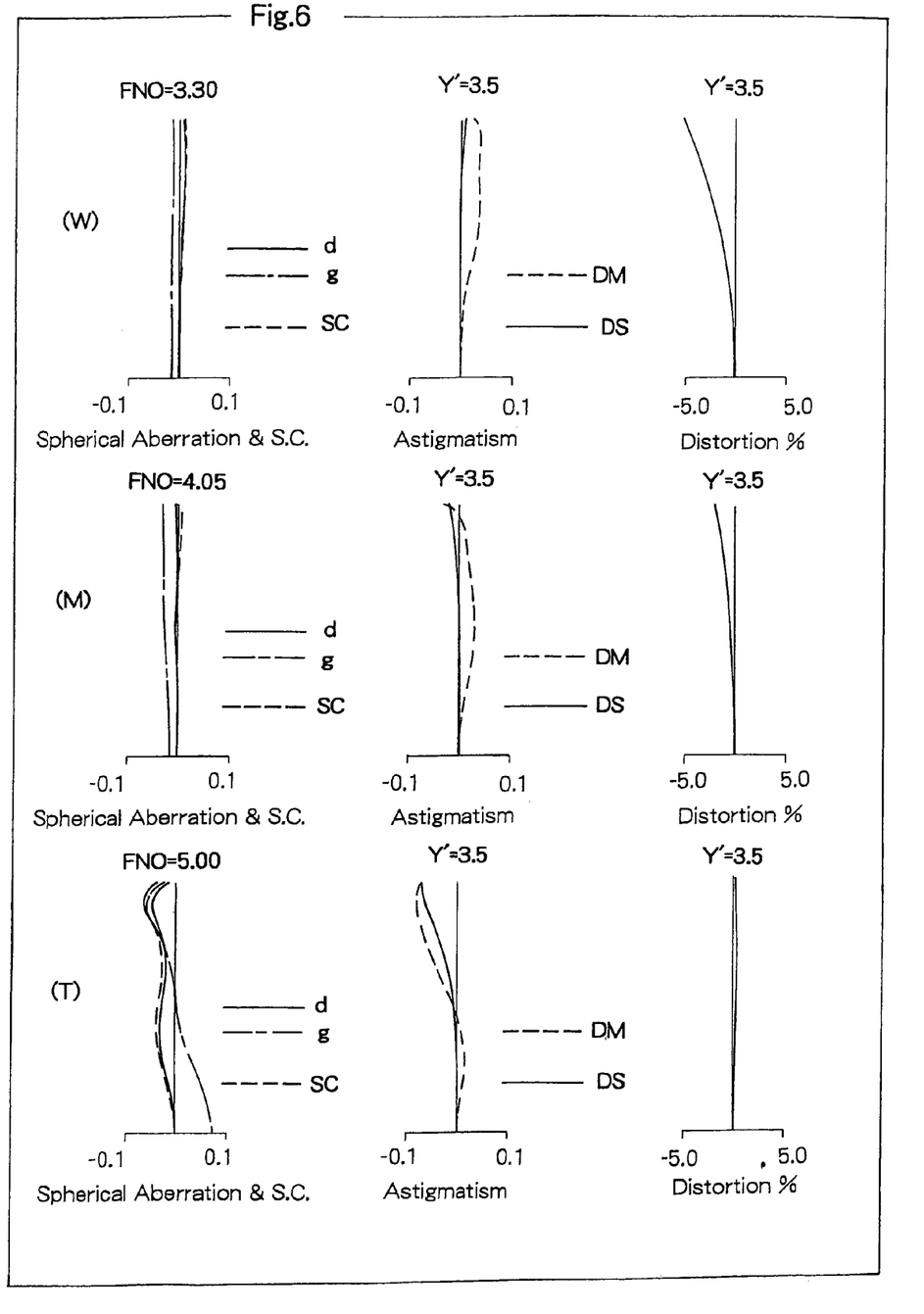
FIG. 6 is graphic representations of aberrations of the third embodiment.

FIGS. 4 to 6 are graphic representations of aberrations corresponding to the first to third examples. (W) show aberrations at wide-angle end in the infinity in-focus state, (M) show aberrations at middle in the infinity in-focus state, and (T) show aberrations at telephoto end in the infinity in-focus state. The left column shows spherical aberrations and sine conditions (S.C.), the middle column shows astigmatisms and right column shows distortions. FNO represents the f-number, and Y' (mm) represents the maximum image height (corresponding to the distance from the optical axis AX) on the light receiving surface SS of the image sensor SR.

In the graphic representations of spherical aberration and sine condition, the solid lines d and the alternate long and short dashed lines g represent the spherical aberration amounts (mm) to the d-line and to the g-line, respectively, and the broken lines SC represent the sine condition dissatisfaction amounts (mm). In the graphic representations of astigmatism, the broken lines DM and the solid lines DS represent the astigmatisms (mm) to the d-line on the meridional surface and on the sagittal surface, respectively. In the graphic representations of distortion, the solid lines represent the distortion (%) to the d-line.

EXAMPLE 1 f = 6.38 – 15.35 – 24.32
FNO. = 3.40 – 4.10 – 4.80

| [Radius of Curvature] | [Axial Distance] | [Refractive Index(Nd)] | [Abbe Number (νd)] | |
|---|---|---|---|---|
| r1 = −99.683 | d1 = 1.000 | N1 = 1.69350 | ν1 = 53.39 | |
| r2* = 7.233 | d2 = 2.558 | | | |
| r3 = 14.046 | d3 = 2.269 | N2 = 1.84666 | ν2 = 23.78 | |
| r4 = 32.248 | d4 = 24.373 – 6.852 – 2.300 | | | |
| r5 = INF(ST) | d5 = 0.400 | | | |
| r6* = 6.322 | d6 = 2.988 | N3 = 1.52510 | ν3 = 56.38 | (L21 (+)) |
| r7* = −29.217 | d7 = 1.264 | | | |
| r8 = 38.506 | d8 = 1.003 | N4 = 1.84666 | ν4 = 23.78 | (L22 (−)) |
| r9 = 6.219 | d9 = 1.718 | | | |
| r10 = 13.168 | d10 = 1.890 | N5 = 1.83400 | ν5 = 37.34 | (L23 (+)) |
| r11 = −401.027 | d11 = 4.935 – 17.037 – 28.462 | | | |
| r12* = 13.283 | d12 = 2.187 | N6 = 1.52510 | ν6 = 56.38 | |
| r13* = 31.657 | d13 = 4.416 – 3.278 – 1.962 | | | |
| r14 = INF | d14 = 0.500 | N7 = 1.54426 | ν7 = 69.60 | |
| r15 = INF | d15 = 1.000 | | | |
| r16 = INF | d16 = 0.500 | N8 = 1.51680 | ν8 = 64.20 | |
| r17 = INF | | | | |

[Aspherical Coefficient]
r2*
  $\epsilon$=1.0000
  A4=−0.31118943E-03
  A6=−0.36651711E-05
  A8=0.59067214E-07
  A10=−0.29444216E-08
r6*
  $\epsilon$=1.0000
  A4=−0.40133141E-03
  A6=−0.44473049E-05
  A8=−0.11192169E-06
  A10=−0.99912493E-08
r7*
  $\epsilon$=1.0000
  A4=0.32863775E-05
  A6=0.46470055E-05
  A8=−0.40854380E-06
  A10=0.35946829E-08
r12*
  $\epsilon$=1.0000
  A4=0.64080390E-03
  A6=−0.46982808E-04
  A8=0.17575946E-05
  A10=−0.21825341E-07
r13*
  $\epsilon$=1.0000
  A4=0.12357330E-02
  A6=−0.79250037E-04
  A8=0.29077070E-05
  A10=−0.32789154E-07

EXAMPLE 2 f = 5.80 – 10.33 – 22.51
FNO. = 2.88 – 3.57 – 5.00

| [Radius of Curvature] | [Axial Distance] | [Refractive Index(Nd)] | [Abbe Number (νd)] | |
|---|---|---|---|---|
| r1 = 426.043 | d1 = 1.000 | N1 = 1.63854 | ν1 = 55.45 | |
| r2* = 6.700 | d2 = 4.124 | | | |
| r3 = 13.974 | d3 = 1.817 | N2 = 1.84666 | ν2 = 23.78 | |
| r4 = 25.309 | d4 = 25.200 – 9.895 – 1.788 | | | |
| r5 = INF(ST) | d5 = 1.000 | | | |
| r6* = 6.000 | d6 = 2.856 | N3 = 1.53048 | ν3 = 55.72 | (L21 (+)) |
| r7* = −23.658 | d7 = 0.200 | | | |
| r8 = 10.239 | d8 = 1.920 | N4 = 1.84666 | ν4 = 23.78 | (L22 (−)) |
| r9 = 3.945 | d9 = 1.597 | | | |
| r10* = 16.373 | d10 = 1.616 | N5 = 1.53048 | ν5 = 55.72 | (L23 (+)) |
| r11* = −31.953 | d11 = 2.595 – 7.166 – 24.314 | | | |
| r12* = −199.111 | d12 = 1.855 | N6 = 1.53048 | ν6 = 55.72 | |
| r13* = −13.960 | d13 = 6.394 – 6.988 – 2.675 | | | |
| r14 = INF | d14 = 0.500 | N7 = 1.51680 | ν7 = 64.20 | |
| r15 = INF | d15 = 0.000 | | | |
| r16 = INF | d16 = 0.500 | N8 = 1.51680 | ν8 = 64.20 | |
| r17 = INF | | | | |

[Aspherical Coefficient]
r2*
  ε=0.6486
  A4=−0.17930926E-03
  A6=0.24063256E-06
  A8=−0.99897329E-07
  A10=0.15900235E-08
  A12=−0.19388392E-10
r6*
  ε=1.0000
  A4=−0.53645718E-03
  A6=−0.13185778E-04
  A8=−0.66111369E-06
  A10=0.27835720E-08
  A12=−0.11323070E-08
r7*
  ε=1.0000
  A4=0.33819391E-03
  A6=−0.23168026E-04
  A8=0.18639947E-06
  A10=−0.32834844E-07
  A12=0.65725712E-09
r10*
  ε=1.0000
  A4=0.14601065E-02
  A6=0.81879514E-04
  A8=0.20789226E-05
  A10=−0.34914545E-06
  A12=0.93026744E-07
r11*
  ε=1.0000
  A4=0.13527018E-03
  A6=0.71107110E-04
  A8=−0.14751633E-05
  A10=−0.55201888E-06
  A12=0.11910418E-06
r12*
  ε=1.0000
  A4=−0.10970249E-02
  A6=0.26536302E-04
  A8=−0.59217880E-05
  A10=0.35314296E-06
  A12=−0.11999558E-07 r13*
  ε=1.0000
  A4=−0.81222625E-03
  A6=−0.11605503E-04
  A8=−0.72676721E-06
  A10=0.42761773E-07
  A12=−0.25913417E-08

EXAMPLE 3 f = 5.80 – 10.33 – 22.51
FNO. = 3.30 – 4.06 – 5.00

| [Radius of Curvature] | [Axial Distance] | [Refractive Index(Nd)] | [Abbe Number (vd)] | |
|---|---|---|---|---|
| r1 = −519.769 | d1 = 1.017 | N1 = 1.63854 | v1 = 55.45 | |
| r2* = 6.809 | d2 = 4.156 | | | |
| r3 = 14.727 | d3 = 1.780 | N2 = 1.84666 | v2 = 23.78 | |
| r4 = 28.580 | d4 = 25.191 – 9.600 – 1.667 | | | |
| r5 = INF(ST) | d5 = 1.000 | | | |
| r6* = 6.000 | d6 = 2.905 | N3 = 1.53048 | v3 = 55.72 | (L21 (+)) |
| r7* = −20.253 | d7 = 0.200 | | | |
| r8 = 10.148 | d8 = 1.908 | N4 = 1.84666 | v4 = 23.78 | (L22 (−)) |
| r9 = 3.862 | d9 = 1.640 | | | |
| r10* = 19.818 | d10 = 1.612 | N5 = 1.53048 | v5 = 55.72 | (L23 (+)) |
| r11* = −26.127 | d11 = 2.588 – 6.774 – 24.265 | | | |
| r12* = −233.241 | d12 = 1.827 | N6 = 1.53048 | v6 = 55.72 | |
| r13* = −14.238 | d13 = 6.178 – 7.045 – 2.500 | | | |
| r14 = INF | d14 = 0.500 | N7 = 1.51680 | v7 = 64.20 | |
| r15 = INF | d15 = 0.000 | | | |
| r16 = INF | d16 = 0.500 | N8 = 1.51680 | v6 = 64.20 | |
| r17 = INF | | | | |

[Aspherical Coefficient]
r2*
  ε=0.5477
  A4=−0.14289775E-03
  A6=0.16506726E-06
  A8=−0.76730405E-07
  A10=0.13675593E-08
  A12=−0.12937724E-10
r6*
  ε=1.0000
  A4=−0.57420945E-03
  A6=−0.15765442E-04
  A8=−0.65745438E-06
  A10=0.10122076E-07
  A12=−0.16975756E-08
r7*
  ε=1.0000
  A4=0.37081757E-03
  A6=−0.27302148E-04
  A8=0.34296255E-06
  A10=−0.26182650E-07
  A12=−0.74333163E-10
r10*
  ε=1.0000
  A4=0.16613459E-02
  A6=0.61497332E-04
  A8=0.63080224E-05
  A10=−0.30857417E-06
  A12=0.90667295E-07
r11*
  ε=1.0000
  A4=0.18524400E-03
  A6=0.51447367E-04

A8=−0.10952020E−05
A10=0.59122297E−06
A12=0.13111930E−06
r12*
ε=1.0000
A4=−0.11697236E−02
A6=0.43645556E−04
A8=−0.40401836E−05
A10=0.64586178E−07
A12=−0.18295651E−08
r13*
ε=1.0000
A4=−0.93564363E−03
A6=0.21306461E−04
A8=−0.18723733E−05

TABLE

|  | Condition(1) $|P22/P21|$ | Condition(2) N1/N2 |
|---|---|---|
| Example 1 | 1.146922 | 0.666667 |
| Example 2 | 1.059158 | 0.666667 |
| Example 3 | 1.060786 | 0.666667 |

|  | Condition(3) ft/fw | Condition(4) Lw/fw | Condition(5) $|f1 \times fw/Lw|$ |
|---|---|---|---|
| Example 1 | 3.811912 | 8.46395 | 1.938444 |
| Example 2 | 3.88 | 9.310345 | 1.903037 |
| Example 3 | 3.88 | 9.310341 | 1.897323 |

As described above, in an image forming device provided with: a zoom lens system comprising a plurality of lens units and performing magnification varying by changing the distance between the lens units; and an image sensor that converts an optical image formed by the zoom lens system into an electric signal, the zoom lens system comprises three lens units of, from the object side, a first lens unit having negative optical power, a second lens unit having positive optical power and a third lens unit having positive optical power, the second lens unit comprises three single lens elements of, from the object side, a positive lens element, a negative meniscus lens element convex to the object side and a positive lens element, and the following condition (1) is satisfied:

$$1.0<|P22/P21|<2.0 \quad (1)$$

where P21 is the optical power of the object side positive lens element in the second lens unit, and P22 is the optical power of the negative meniscus lens element in the second lens unit.

Or in the above-described first structure, a magnification variation range is provided in which the first lens unit moves toward the image side and the second lens unit moves toward the object side in zooming from the wide angle end to the telephoto end.

Or in the above-described structures, the following condition (2) is further satisfied:

$$N1/N2<1 \quad (2)$$

where N1 is the number of lens elements constituting the first lens unit, and N2 is the number of lens elements constituting the second lens unit.

Or in the above-described structures, the following condition (3) is further satisfied:

$$3<ft/fw<5 \quad (3)$$

where fw is the overall focal length of the zoom lens system at the wide angle end, and ft is the overall focal length of the zoom lens system at the telephoto end.

Or in the above-described structures, the following condition (4) is further satisfied:

$$7<Lw/fw<10 \quad (4)$$

where Lw is the overall optical length (the length from the most object side surface of the zoom lens system to the image surface) at the wide angle end, and fw is the overall focal length of the zoom lens system at the wide angle end.

Or in the above-described structures, the following condition (5) is further satisfied:

$$1.5<|f1 \times fw/Lw|<2.5 \quad (5)$$

where f1 is the focal length (mm) of the first lens unit, fw is the overall focal length (mm) of the zoom lens system at the wide angle end, and Lw is the overall optical length (the length from the most object side surface of the zoom lens system to the image surface, mm) at the wide angle end.

Or a digital camera having an image forming device having the above-described structures is constructed.

According to the above-described structures, since the second lens unit satisfies a predetermined condition, a compact image forming device can be realized that is capable of obtaining a magnification variation ratio of as high as not less than three times without increasing the number of lens elements of the second lens unit while ensuring high optical performance and low cost in a three-unit zoom lens system of negative, positive, positive configuration. The use of the image forming device according to the present invention for apparatuses such as digital cameras and portable information apparatuses contributes to reduced thickness, weight and size, reduced cost, higher performance, higher functionality and the like of these apparatus.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image forming device comprising:

a zoom lens system including a plurality of lens units and performing magnification varying by changing a distance between the lens units; and an image sensor that converts an optical image formed by the zoom lens system into an electric signal, wherein the zoom lens system includes three lens units of, from an object side, a first lens unit having negative optical power, a second lens unit having positive optical power and a third lens unit having positive optical power, the second lens unit includes three single lens elements of, from the object side, a positive lens element, a negative meniscus lens element convex to the object side and a positive lens element, and the following conditions are satisfied:

$$1.0<|P22/P21|<2.0$$

and $$1.5<|f1 \times fw/Lw|<2.0$$

where
- P21: optical power of the object side positive lens element in the second lens unit,
- P22: optical power of the negative meniscus lens element in the second lens unit,
- f1: a focal length (mm) of the first lens unit,
- fw: an overall focal length (mm) of the zoom lens system at the wide angle end, and
- Lw: an overall optical length, that is, a length from a most object side surface of the zoom lens system to an image surface, at the wide angle end.

2. An image forming device according to claim 1, wherein the zoom lens system has a magnification variation range in which the first lens unit moves toward an image side and the second lens unit moves toward the object side in zooming from a wide angle end to a telephoto end.

3. An image forming device according to claim 1, wherein the following condition is satisfied:

$$N1/N2<1$$

where
- N1: number of lens elements constituting the first lens unit, and
- N2: number of lens elements constituting the second lens unit.

4. An image forming device according to claim 1, wherein the following condition is satisfied:

$$3<ft/fw<5$$

where
- fw: an overall focal length of the zoom lens system at the wide angle end, and
- ft: an overall focal length of the zoom lens system at the telephoto end.

5. An image forming device according to claim 1, wherein the following condition is satisfied:

$$7<Lw/fw<10$$

where
- Lw: an overall optical length, that is, a length from a most object side surface of the zoom lens system to an image surface, at the wide angle end, and
- fw: an overall focal length of the zoom lens system at the wide angle end.

6. A digital camera comprising:
a camera body;
a zoom lens system including a plurality of lens units and performing magnification varying by changing a distance between the lens units; and
an image sensor that converts an optical image formed by the zoom lens system into an electric signal,
wherein the zoom lens system includes three lens units of, from an object side, a first lens unit having negative optical power, a second lens unit having positive optical power and a third lens unit having positive optical power, the second lens unit includes three single lens elements of, from the object side, a positive lens element, a negative meniscus lens element convex to the object side and a positive lens element, and the following conditions are satisfied:

$$1.0<|P22/P21|<2.0$$

and $$1.5<|f1 \times fw/Lw|<2.0$$

where
- P21: optical power of the object side positive lens element in the second lens unit,
- P22: optical power of the negative meniscus lens element in the second lens unit,
- f1: a focal length (mm) of the first lens unit,
- fw: an overall focal length (mm) of the zoom lens system at the wide angle end, and
- Lw: an overall optical length, that is, a length from a most object side surface of the zoom lens system to an image surface, at the wide angle end.

7. A digital camera according to claim 6, wherein the zoom lens system has a magnification variation range in which the first lens unit moves toward an image side and the second lens unit moves toward the object side in zooming from a wide angle end to a telephoto end.

8. A digital camera according to claim 6, wherein the following condition is satisfied:

$$N1/N2<1$$

where
- N1: number of lens elements constituting the first lens unit, and
- N2: number of lens elements constituting the second lens unit.

9. A digital camera according to claim 6, wherein the following condition is satisfied:

$$3<ft/fw<5$$

where
- fw: an overall focal length of the zoom lens system at the wide angle end, and
- ft: an overall focal length of the zoom lens system at the telephoto end.

10. A digital camera according to claim 6, wherein the following condition is satisfied:

$$7<Lw/fw<10$$

where
- Lw: an overall optical length, that is, a length from a most object side surface of the zoom lens system to an image surface, at the wide angle end, and
- fw: an overall focal length of the zoom lens system at the wide angle end.

11. An image forming device comprising:
a zoom lens system including a plurality of lens units and performing magnification varying by changing a distance between the lens units; and
an image sensor that converts an optical image formed by the zoom lens system into an electric signal,
wherein the zoom lens system includes three lens units of, from an object side, a first lens unit having negative optical power, a second lens unit having positive optical power and a third lens unit having positive optical power, the second lens unit consists essentially of three single lens elements of, from the object side, a positive lens element, a negative meniscus lens element convex to the object side and a positive lens element, and the following conditions are satisfied:

$$1.0<|P22/P21|<2.0$$

$$1.5<|f1 \times fw/Lw|<2.0$$

where
- P21: optical power of the object side positive lens element in the second lens unit,
- P22: optical power of the negative meniscus lens element in the second lens unit, f1: a focal length (mm) of the first lens unit, fw: an overall focal length (mm) of the zoom lens system at the wide angle end, and Lw: an overall optical length, that is, a length from a most object side surface of the zoom lens system to an image surface, at the wide angle end.

12. A digital camera comprising:

a camera body;

a zoom lens system including a plurality of lens units and performing magnification varying by changing a distance between the lens units; and an image sensor that converts an optical image formed by the zoom lens system into an electric signal, wherein the zoom lens system includes three lens units of, from an object side, a first lens unit having negative optical power, a second lens unit having positive optical power and a third lens unit having positive optical power, the second lens unit consists essentially of three single lens elements of, from the object side, a positive lens element, a negative meniscus lens element convex to the object side and a positive lens element, and the following conditions are satisfied:

$$1.0 < |P22/P21| < 2.0$$

$$1.5 < |f1 \times fw/Lw| < 2.0$$

where

P21: optical power of the object side positive lens element in the second lens unit, and P22: optical power of the negative meniscus lens element in the second lens unit f1: a focal length (mm) of the first lens unit, fw: an overall focal length (mm) of the zoom lens system at the wide angle end, and Lw: an overall optical length, that is, a length from a most object side surface of the zoom lens system to an image surface, at the wide angle end.

* * * * *